Patented May 9, 1933

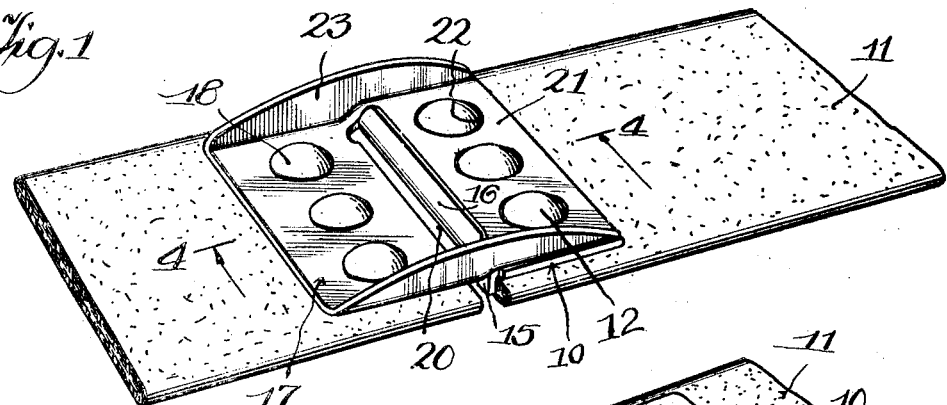
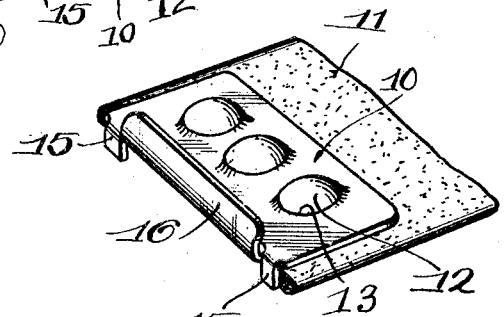
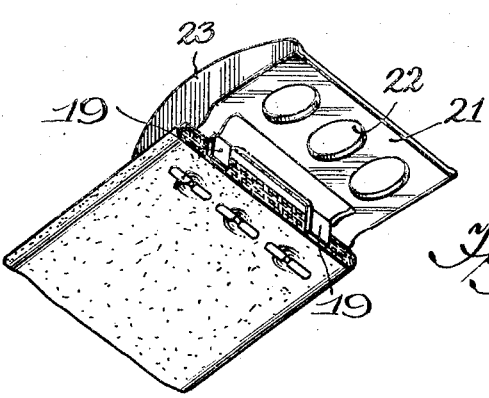
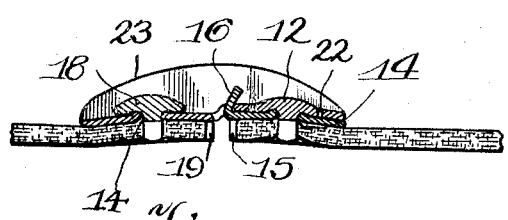
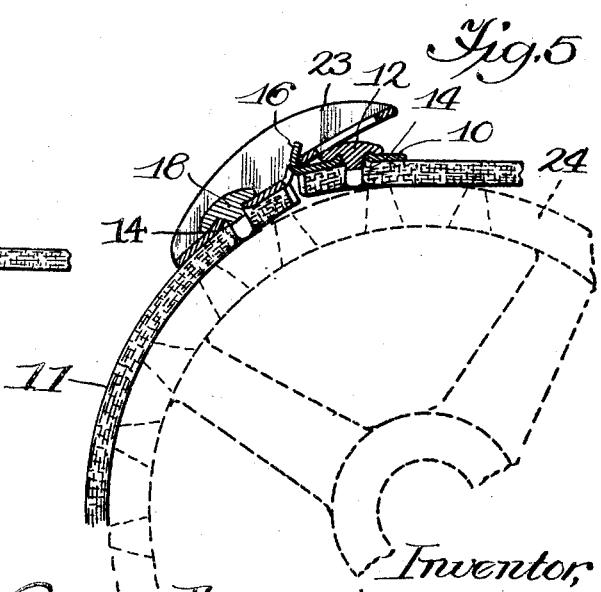

1,907,913

UNITED STATES PATENT OFFICE

ERNEST WANAMAKER, OF CHICAGO, ILLINOIS

BELT FASTENER

Application filed May 16, 1932. Serial No. 611,595.

This invention relates to improvements in belt fasteners.

One object of the invention is to provide a belt fastener, formed of two parts hinged together, which permit the belt to remain in suitably close contact with the surface of a pulley around which the belt passes, thus providing better traction and avoiding excessive flexing of the belt adjacent the rivets or the like.

Another object of the invention is to provide a two-part belt fastener, one part of which has a portion adapted to extend over the surface of the other part during a straight line pull on the belt, as when the fastener is traveling from one pulley to another to prevent back bowing of the belt and disconnecting the fastener parts.

A further object is to provide a belt fastener, provided with concavities adjacent the holes for the rivets or other fastening means into which portion of the belt are drawn by said means to more firmly secure the fastener to the belt.

Other objects relate to various features of construction and arrangement of parts, which will be apparent from a consideration of the following specification and accompanying drawing, wherein Figure 1 is a perspective view of a belt fastener, embodying the present improvements shown attached to a belt.

Figure 2 is a perspective view of the lower side of one of the belt sections.

Figure 3 is a perspective view of the other belt section.

Figure 4 is a sectional view taken on line 4—4 of Figure 1.

Figure 5 is a sectional view of the fastener and belt showing the same passing around a pulley.

In the drawing, 10 is a fastener section adapted to be secured to an end of a belt 11 by means of rivets 12 or other suitable fastening means, three being shown in the drawing. The belt fastener sections preferably are made of sheet metal and the portions thereof surrounding the openings 13 are pressed upwardly, as indicated in Figure 3 to form concavities 14 on the lower surface of the section 10, as more clearly shown in Figures 4 and 5. The rivets 12 draw portions of the belt up into these concavities and thereby increase the frictional contact of the section 10 with the belt and more securely anchor the parts together. The section 10 is preferably provided with a pair of lugs 15 against which the end of the belt abuts. These lugs 15 act as stop members to enable the mechanic to adjust the fastener section properly and expeditiously on the belt prior to securing the parts together by the rivets or fasteners 12. The free end of the section 10 terminates in an upwardly and rearwardly disposed hook 16. The other fastener section 17 is provided with openings for receiving rivets 18 or the like for securing the section on an adjacent end of the belt, the metal around the openings being pressed to one side to form similar concavities 14 into which the belt is drawn slightly by the rivets as indicated in Figure 2. This section likewise has a pair of stop lugs 19, as shown in Figure 2, for example.

The section 17 has a transverse slot 20 into which the hook 16 is detachably disposed for connecting the fastener sections together. The section 17 has a portion 21 extended from beyond the slot 20 approximately sufficiently to overlie the section 10 when the sections are engaged. This portion 21 is offset vertically from the plane of a section 17 a distance substantially equal to the thickness of the metal of which section 10 is made. Thus, when the sections are connected, section 10 and section 17 are disposed in substantially the same plane, with the portion 21 overlying section 10. To accommodate the heads of rivets 12, the portion 21 of section 17 preferably is provided with apertures 22 which are sufficiently large to receive the rivet heads 12 and permit the portion 21 to lie flat upon the section 10. This arrangement is shown in Figures 1 and 4.

Section 17 is also preferably provided with suitable truss or stiffening members 23 which may comprise upwardly turned flanges at the sides of the member 17. These add rigidity to the member 17 whereby the section cannot flex to permit back bowing of the belt when the fastener is traveling between the pulleys. The strain on belts which are secured to fasteners by rivets frequently has caused the free ends of the belts to bow downwardly and, as the ends approach the pulley, they are subjected to additional stresses which loosens the rivets or tears the belts after a period of use. By the arrangement described, that is, with the section 17 having an extension 21 which overlies the section 10, the tendency of the belt to bow downwardly slightly adjacent the abutting ends of the belt is prevented and longer service of the belt is assured.

As shown in Figures 4 and 5, the sections 10 and 17 are provided with a slight camber or curvature, which provides a closer contact of the surface of the belt with a pulley, such as 24, in passing over the same. The construction shown hinges readily upon the hook 16 in passing around the pulleys and, due to the overlapping relation, the fastener sections do not become disconnected in use. They may, however, be disconnected readily whenever it is desirable to remove the belt from the pulley.

While I have shown apertures 22 in the part 21 which permit the latter portion to lie flat upon the section 10, it will be apparent that, instead of forming the recesses as openings, they may be formed as concavities by pressing the metal outwardly.

Other changes in the construction may suggest themselves to those skilled in the art and I, therefore, do not wish to be restricted specifically to the embodiment herein shown and described except as so limited by the appended claims.

I claim:

1. A belt fastener comprising a pair of members, each having openings therein for receiving means for attaching the same to adjacent ends of a belt, one of said members being provided with a central transverse slot, said other member having a hook adapted to engage in said slot to provide a readily detachable hinged connection, said first member having its free end extended to overlie said second member to prevent back bow of the connected ends of the belt during travel of the same between pulleys.

2. A belt fastener comprising a pair of members, each having openings therein for receiving means for attaching the same to adjacent ends of a belt, one of said members being provided with a central transverse slot, said other member having a hook adapted to engage in said slot to provide a readily detachable hinged connection, said first member having its free end extended to overlie said second member to prevent back bow of the connected ends of the belt during travel of the same between pulleys, and truss members on said first member along the longitudinal sides thereof.

3. A belt fastener comprising a pair of hinged members provided with a camber in longitudinal section, and trusses on one of said members, said trussed member having a free end extending over said other member and adapted to contact with the same during the travel of said members between pulleys.

4. A belt fastener comprising a pair of members adapted to be secured to the adjacent ends of a belt, one of said members having a transverse slot therein and a recessed free portion projecting beyond said slot a distance substantially equal to the length of the second member, said second member having a hook insertable in said slot to provide a hinge connection, headed devices extending through said second member for securing the same to said belt, said free portion of said first member having recesses therein for accommodating said heads whereby said portion can move into contact with said second member during travel of the members between pulleys.

5. A belt fastener comprising a pair of members, means for securing said members to adjacent ends of a belt, one of said members being provided with a hook, said other member having a slot therein for engagement with said hook to provide a hinged connection, said slotted member having a portion extending over said hooked member, said extending portion having recesses therein for accommodating the ends of the securing means of said hooked member.

In testimony whereof, I have subscribed my name.

ERNEST WANAMAKER.